United States Patent
McLean et al.

(10) Patent No.: US 7,783,897 B2
(45) Date of Patent: Aug. 24, 2010

(54) PROGRAMMABLE LOGIC DEVICE

(75) Inventors: Ian McLean, Woking (GB); Stephen Mark Keating, Reading (GB)

(73) Assignee: Sony United Kingdom Limited, Weybridge (GB)

(*) Notice: Subject to any disclaimer, the term of this patent is extended or adjusted under 35 U.S.C. 154(b) by 1182 days.

(21) Appl. No.: 11/368,594

(22) Filed: Mar. 7, 2006

(65) Prior Publication Data

US 2006/0265603 A1 Nov. 23, 2006

(30) Foreign Application Priority Data

Mar. 24, 2005 (GB) ................. 0506117.1

(51) Int. Cl.
*H04L 9/00* (2006.01)
*H04K 1/00* (2006.01)
*G06F 9/00* (2006.01)

(52) U.S. Cl. .................. 713/189; 713/100; 716/16

(58) Field of Classification Search ........... None
See application file for complete search history.

(56) References Cited

U.S. PATENT DOCUMENTS

| | | | | |
|---|---|---|---|---|
| 5,970,142 | A * | 10/1999 | Erickson ............... | 713/189 |
| 6,212,639 | B1 * | 4/2001 | Erickson et al. ........ | 726/26 |
| 6,351,814 | B1 | 2/2002 | Batinic et al. | |
| 6,356,637 | B1 | 3/2002 | Garnett | |
| 6,457,125 | B1 * | 9/2002 | Matthews et al. ....... | 713/160 |
| 6,654,889 | B1 * | 11/2003 | Trimberger ............ | 713/191 |
| 6,931,543 | B1 * | 8/2005 | Pang et al. ............ | 713/193 |
| 6,957,340 | B1 * | 10/2005 | Pang et al. ............ | 713/189 |
| 6,965,675 | B1 * | 11/2005 | Trimberger et al. ...... | 380/277 |
| 6,981,153 | B1 * | 12/2005 | Pang et al. ............ | 713/194 |
| 7,058,177 | B1 * | 6/2006 | Trimberger et al. ....... | 380/28 |
| 7,117,372 | B1 * | 10/2006 | Trimberger et al. ...... | 713/189 |
| 7,127,616 | B2 * | 10/2006 | Kaneko ............... | 713/191 |
| 7,134,025 | B1 * | 11/2006 | Trimberger ............ | 713/189 |
| 7,162,644 | B1 * | 1/2007 | Trimberger ............ | 713/189 |
| 7,197,647 | B1 * | 3/2007 | Van Essen et al. ...... | 713/189 |
| 7,200,235 | B1 * | 4/2007 | Trimberger ............ | 380/277 |
| 7,203,842 | B2 * | 4/2007 | Kean .................. | 713/189 |
| 7,219,237 | B1 * | 5/2007 | Trimberger ............ | 713/193 |
| 7,240,218 | B2 * | 7/2007 | Kean .................. | 713/193 |
| 7,373,668 | B1 * | 5/2008 | Trimberger ............ | 726/26 |
| 7,389,429 | B1 * | 6/2008 | Trimberger ............ | 713/194 |
| 2002/0129244 | A1 | 9/2002 | DaCosta | |
| 2002/0199110 | A1 * | 12/2002 | Kean .................. | 713/189 |
| 2003/0005292 | A1 * | 1/2003 | Matthews et al. ....... | 713/160 |
| 2008/0270805 | A1 * | 10/2008 | Kean .................. | 713/189 |
| 2009/0013193 | A1 * | 1/2009 | Matsuzaki et al. ...... | 713/189 |

* cited by examiner

*Primary Examiner*—Christopher A Revak
(74) *Attorney, Agent, or Firm*—Oblon, Spivak, McClelland, Maier & Neustadt, L.L.P.

(57) ABSTRACT

A hardware decryption processor operates, when power is applied to a programmable logic device, to read an encrypted configuration program, to decrypt the encrypted configuration program using a first secret configuration key stored in a register, and to configure a programmable array of logic elements with the configuration program. The programmable array when configured with the configuration program operates to read the encrypted configuration program from a non-volatile store, to decrypt the configuration program using the first secret configuration key, which was provided with the configuration program, to generate a second secret key, to adapt the configuration program by inserting the second secret key into the configuration program, to re-encrypt the adapted configuration program using the first secret configuration key, and to replace the configuration program with the adapted and encrypted configuration program in the non-volatile store.

14 Claims, 9 Drawing Sheets

PROGRAMMABLE LOGIC DEVICE

FIELD OF THE INVENTION

The present invention relates to programmable logic devices which include programmable arrays of volatile logic elements which when configured with a configuration program are operable to perform a process in accordance with the configuration of the logic elements by the configuration program.

BACKGROUND OF THE INVENTION

It is known to distribute content by encrypting the content using a secret key and then encrypting the secret key using a public key of a private key/public key pair. The content is encrypted using a secret key which provides what is referred to as symmetrical encryption because encryption and decryption is effected in accordance with similar operations as part of a reciprocal process. Symmetrical encryption and decryption using a private secret key is relatively simple in terms of the computations, which are require to effect the encryption or decryption process. In contrast, asymmetric encryption which is effected using a public key/private key pair such as that used in accordance with the Rivest-Shamir-Adleman (RSA) algorithm is computationally more involved, but is to some extent more secure. Accordingly, asymmetric encryption using the public key/private key pair is not used for the content data, which represents a substantial amount of data, because of the substantially greater amount of computations required to encrypt using asymmetric encryption. For this reason, in known systems for distributing content, the content data is encrypted with the private secret key. The private secret key, which is used for encrypting the content will be referred to as the content key. The content key is encrypted with the public key of the private key/public key pair and distributed with the encrypted content. Thus by providing the receiver of the content with the private key corresponding to the public key, the receiver can decrypt the content key thereby recovering the content by decrypting that content using the content key. For example, it is known to broadcast television programs to set top boxes using such an arrangement in which a smart card is provided with the private key of the public key/private key pair for decrypting the content key.

Field programmable gate arrays are an example of programmable logic devices which can be used to form an encryption or decryption processor by providing the field programmable gate array (FPGA) with a configuration program which configures the gate array to form an encryption and/or decryption processor. In order to be secure the FPGA must be provided with the configuration program in an encrypted form. This is because, if an attacker could recover the configuration program then it may be possible to identify the encryption/decryption algorithm and/or private keys for encrypting/decrypting. Furthermore, the encryption keys must be provided securely. To this end, some manufacturers of FPGAs such as Xilinx (RTM) provide an FPGA with an on-chip hardware decryption processor for decrypting a configuration program stored in a non-volatile memory as part of the FPGA. When power up occurs on the FPGA, the configuration program is first decrypted by the hardware decryption processor using a first secret configuration key stored in a register in the decryption hardware. The decryption hardware is also provided with additional hardware protection to hinder attempts to determine the decryption algorithm and the secret configuration key. Thus, the configuration program can be encrypted so that intellectual property associated with the configuration program, which will provide the functionality of the FPGA, can be protected.

SUMMARY OF INVENTION

An object of the present invention is to improve security in programmable logic devices, in which a configuration program is loaded from a non-volatile store. A further object of the present invention is to improve the security of the configuration program of the programmable logic devices.

According to the present invention, there is provided a programmable logic device comprising a programmable array of volatile logic elements which when loaded with a configuration program is operable to perform a process in accordance with the configuration of the logic elements by the configuration program. The programmable logic device includes a hardware decryption processor which includes a register having stored therein a first secret configuration key. A non-volatile store is arranged to store a configuration program, which has been encrypted with the first secret configuration key. The configuration program includes therein the first secret configuration key. The hardware decryption processor is operable, when power is applied to the programmable logic device to read the encrypted configuration program, to decrypt the encrypted configuration program using the first secret configuration key stored in the register, and to configure the programmable array of logic with the configuration program. The programmable logic array when configured with the configuration program is operable to read the encrypted configuration program from the non-volatile store, to decrypt the configuration program using the first secret configuration key provided with the configuration program, to generate a second secret key and to adapt the configuration program by inserting the second secret key into the configuration program. The configured programmable array is operable to re-encrypt the adapted configuration program using the first secret configuration key, and to replace the configuration program with the adapted configuration program in the memory.

Embodiments of the present invention provide an arrangement in which a configuration program is loaded into a programmable logic device so as to configure the logical device as an encryption and/or decryption processor for encrypting/decrypting encrypted content.

Embodiments of the present invention provide a programmable logic device with an encrypted configuration program in a non-volatile store of the device. The configuration program includes a first secret configuration key, which was used to encrypt the configuration program as part of the configuration program. Upon power-up, the hardware decryption processor decrypts the encrypted configuration program using the first secret configuration key stored in the register of the hardware processor and configures the programmable array using the configuration program. The configuration program configures the programmable array to provide a decryption processor, which performs the same function as the hardware decryption processor provided by the manufacturer of the programmable logic device, in that the decryption processor can perform the same decryption process as that which the hardware decryption processor performs. The configured array then re-reads the encrypted configuration program file from the non-volatile store and decrypts the encrypted configuration program using the first secret configuration key which is provided with the version of the configuration program decrypted by the hardware decryption processor. The configured programmable array then generates itself a secret key. The configured programmable array then inserts the secret key into the configuration program to form an adapted configuration program. The configured programmable array then forms an encryption processor, which encrypts the adapted configuration program using the first secret configuration key and overwrites the encrypted configuration program in the non-volatile store. Effectively, therefore the programmable logic device has generated a secret key, which is in effect known only to that device. As such the secret key is added to the configuration program before being encrypted using the configuration key. As a result the secret key is never known outside the programmable logic device and remains secure when stored in the non-volatile store because it is protected by the first secret configuration key.

In one example, the secret key is a private key of a private key/public key pair for encrypting data, using an asymmetric encryption process, such as, for example the RSA algorithm. In another example, the secret key is a private key for use in a symmetric encryption process. If the secret key is a private key for symmetric encryption then the length of the key is typically shorter than the length of a private key for asymmetric encryption. For example, a private key for asymmetric encryption may be 2048-bits long, whereas a private key for symmetric encryption may be 128-bits long. For some applications it may therefore be advantageous to use a private key for symmetric encryption because this can be more easily stored in the non-volatile store where a storage capacity may be limited. In another example, the private key may be used to encrypt a private key/public key pair for asymmetric encryption, the encrypted key pair being stored in a second non-volatile store. Accordingly, the private key for the asymmetric encryption is not stored in the same non-volatile store as the configuration program, thereby alleviating a problem associated with a limited storage capacity of the first non-volatile store.

Embodiments of the present invention can therefore provide an encryption/decryption processor, which can be formed using a programmable logic device with improved security in reducing a likelihood that an attacker may discover the private key and recover the contents against the wishes of the distributor.

Various further aspects and features of the present inventions are defined in the appended claims and include a receiver, a transmitter, a configuration program and a method of programming a programmable logic device.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF EXAMPLE EMBODIMENTS

Figure 1:
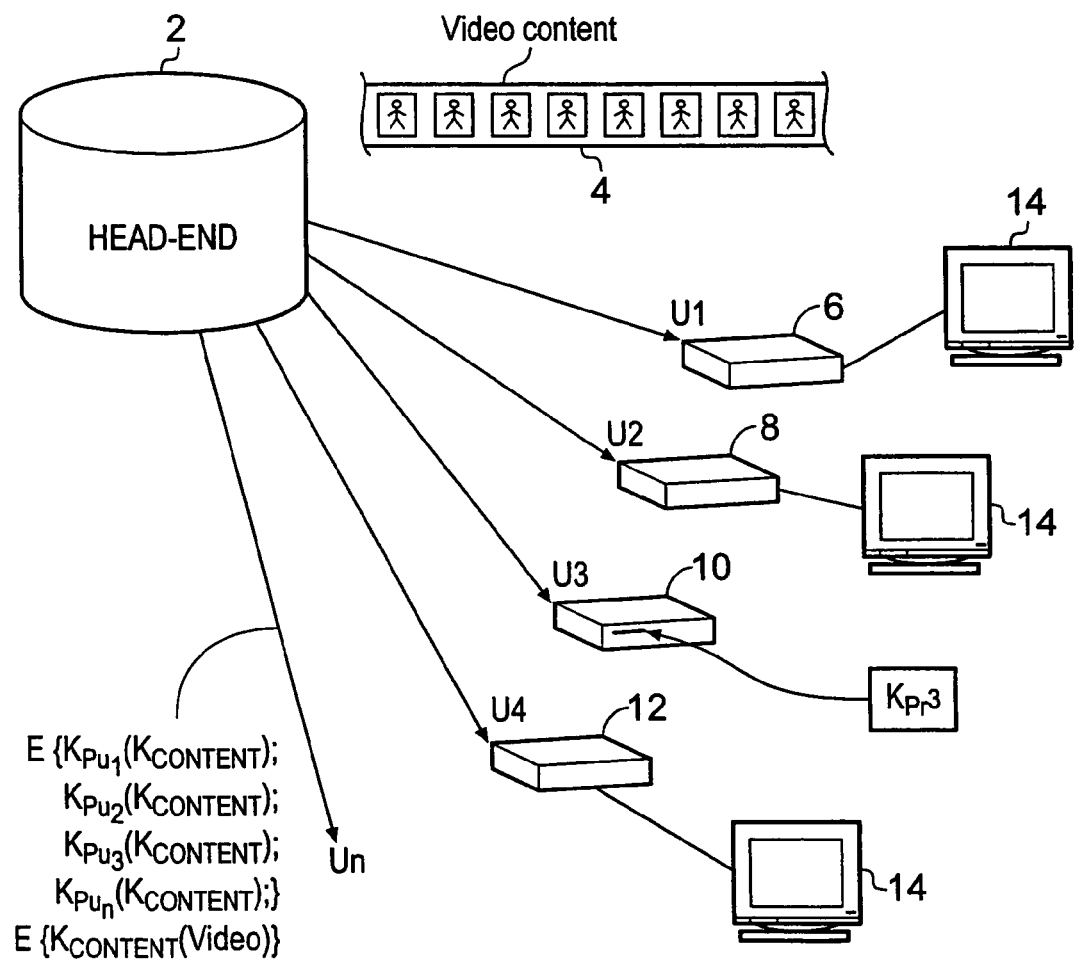
FIG. 1 is a schematic block diagram illustrating an arrangement in which content data is distributed to television receivers via set-top boxes.

FIG. 1 provides an example distribution arrangement in which television programmes are encrypted and distributed from a head-end to users' set-top boxes, where the programmes are decrypted for viewing by the users. However, it will be appreciated that this is just one example application of an encryption/decryption processor, which can be formed using the present technique. It will be appreciated therefore, that other arrangements may use different forms of content such as audio signals or text data or any other type of information.

In FIG. 1 a head end 2 is arranged to transmit encrypted video content 4 to each of N set top boxes 6, 8, 10, 12 for viewing by users using associated television receivers 14.

In a known arrangement the video content is first encrypted using a secret key referred to as a content key which is common to each version of the encrypted video content received by each of the users on each channel U1, U2, U3, U4, UN. As explained above, secret key encryption is used to provide a symmetrical encryption process because this is computationally relatively simple compared to public key encryption. Accordingly, processing which is required in order to encrypt a relatively large amount of data represented by the video content 4 is substantially reduced compared to an amount of processing required to perform public key encryption. However, each of the set-top boxes 6, 8, 10, 12 must receive the content key in order to decode the video content. Typically, the content key $K_{content}$ changes periodically in order to maintain security of the distribution arrangement.

In order to distribute the content key $K_{content}$ to each of the set top boxes 6, 8, 10, 12 the content key $K_{content}$ is encrypted with a public key of a private key/public key pair which is associated with each of the users U1, U2, U3, U4, Un. Each of the users is provided with the corresponding private key on a smart card, which is uniquely associated with that user. In operation, the content key $K_{content}$ is encrypted with each of the public keys and transmitted with the encrypted video content to the set top boxes. Each set top box is therefore able to decrypt the content key $K_{content}$ using the private key corresponding to the public key for that user, to decrypt the content key $K_{content}$. Accordingly, the set top box for that user is able to recover the video content by decrypting the content key $K_{content}$ and then decrypting the video using that content key.

Figure 2:
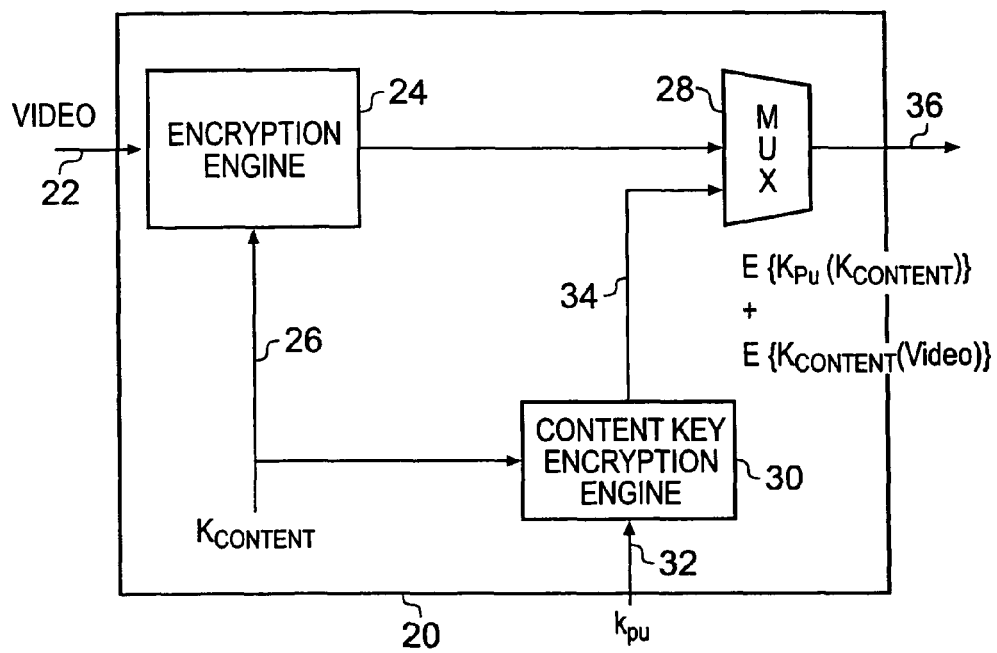
FIG. 2 is a schematic block diagram of an encryption processor, which is arranged to encrypt content data for distribution.

An encryption processor and a decryption processor which can implement a system for distributing encrypted content, such as that illustrated by the example of FIG. 1, is shown in FIG. 2. In FIG. 2 an encryption engine 20 is arranged to receive video content on a channel 22 at an encryption processor 24. The encryption engine 24 is also arranged to receive a content key $K_{content}$ on a second channel 26. The secret content key $K_{content}$ may be generated separately or may be generated within the encryption processor 20. The encryption engine 24 then encrypts the video content using the secret content key $K_{content}$ using a symmetrical private key encryption process and forwards the encrypted video content to a multiplexer 28. The secret content key $K_{content}$ is also received at a content key encryption engine 30. The content key encryption engine 30 performs a public key encryption, receiving a public key $K_{pu}$ on an input channel 32 and encrypts the content key $K_{content}$ to provide on an output channel 34 the encrypted content key $E\{K_{pu}(K_{content})\}$ which has been encrypted using public key encryption using the public key $K_{pu}$. The multiplexer 28 then multiplexes the encrypted video with the encrypted content key to form at an output of the encryption processor 36 a bitstream comprising the encrypted video and the encrypted content key.

Figure 3:
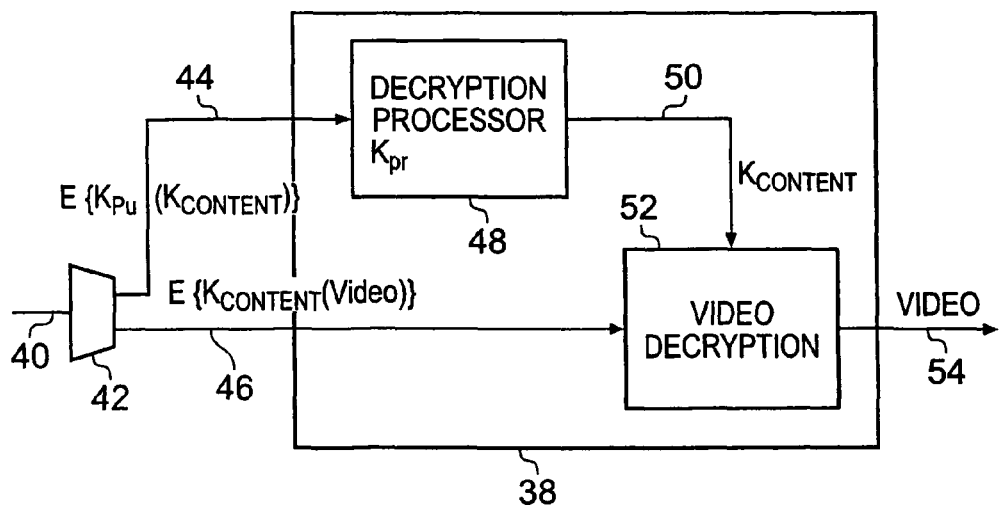
FIG. 3 is a schematic block diagram of a decryption processor, which is arranged to decrypt content which has been encrypted by the encryption processor of FIG. 2.

A decryption processor 38, which may for example form part of a set-top box of the system shown in FIG. 1, is provided in FIG. 3. In FIG. 3 the bit stream comprising the encrypted video and the encrypted content key is received on an input channel 40 to a de-multiplexer 42. The de-multiplexer 42 separates the encrypted video content and the encrypted content key onto two channels 44 and 46. On the first channel 44 the content key $K_{content}$ which has been encrypted with the public key $K_{pu}$ is sent to a first decryption engine 48. The first decryption engine 48 decrypts the content key $K_{content}$ using the corresponding private key of the public key $K_{pu}$ to generate the content key $K_{content}$ at an output 50. The content key is received via the output channel 50 at a second decryption engine 52 for decrypting the video content. The encrypted video content is received via the connecting channel 46 at the second decryption engine 52 which decrypts the encrypted video using the content key $K_{content}$ to produce at an output 54 the decrypted video stream.

According to the present technique a programmable logic device is arranged to form one or both of the first decryption engine 48 or the encryption engine 24 in the encryption and decryption processors 20, 38 respectively. As will be appreciated, the encryption and decryption processors 20, 38 are potentially vulnerable areas of attack. An unscrupulous user may attack the decryption processor 38 to attempt to discover the private key $K_{PR}$ for decrypting the content key $K_{content}$ thereby decrypting the video content without authorisation and/or payment. As will be explained shortly, the present technique provides a programmable logic device with an encrypted configuration program, which is arranged to generate a private key/public key pair and to adapt itself with the private key $K_{PR}$. The programmable logic device then encrypts its configuration program, which is then stored in a non-volatile store for subsequent use. Since the programmable logic device itself generates the private secret key $K_{PR}$ which is otherwise not known to either the manufacturer of the programmable logic device or indeed the user, a substantial improvement in security is provided in for example an arrangement of distributing encrypted content. An example illustration of such a programmable logic device is presented in FIG. 4.

Figure 4:
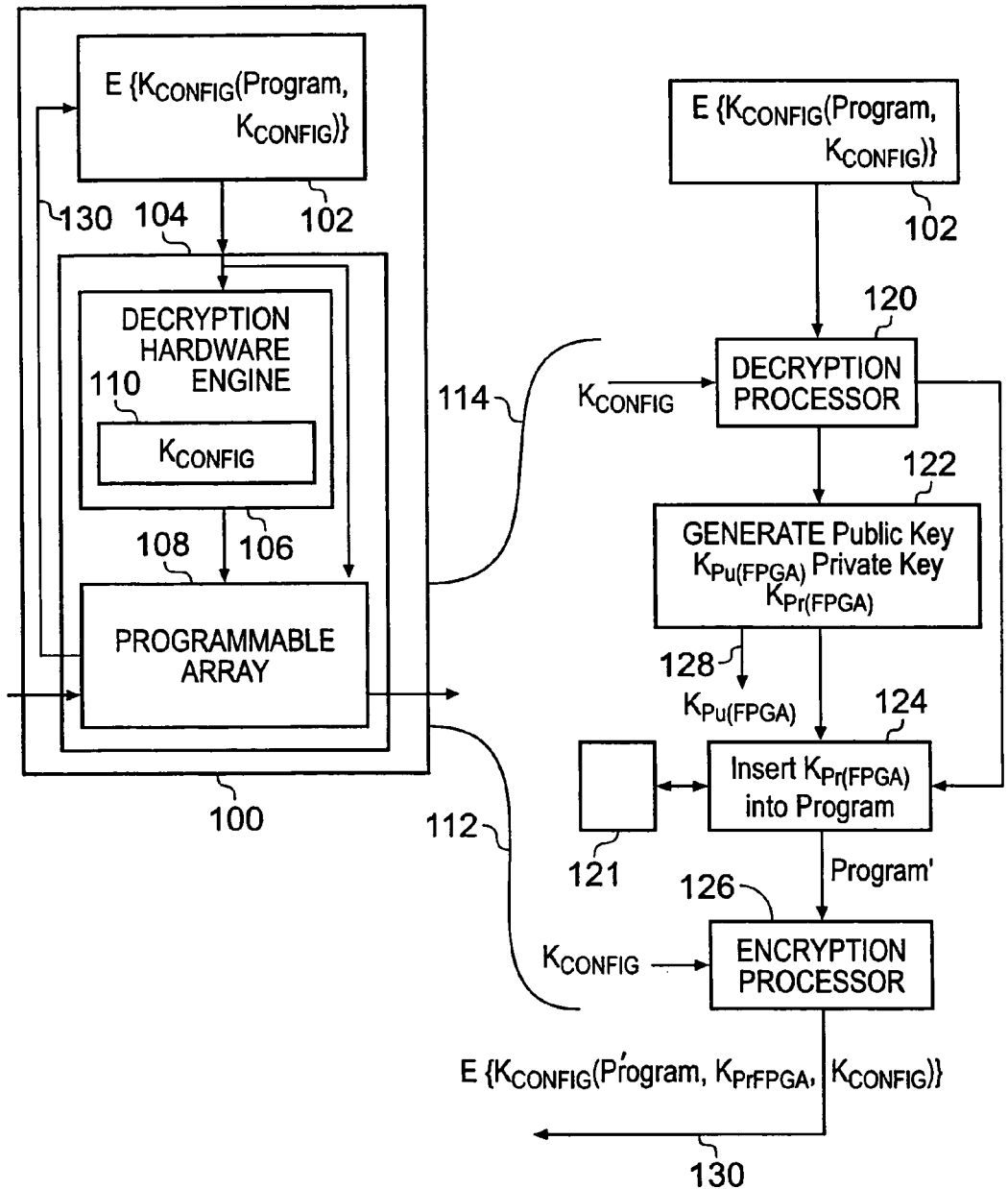
FIG. 4 is a part schematic block diagram, part flow diagram illustrating a programmable logic device which is configured to perform a process of encrypting and/or decrypting data.

In FIG. 4 a field programmable gate array (FPGA) 100 includes a non-volatile store 102 as well as a hardware processor 104. The hardware processor 104 includes a hardware decryption engine 106 and a programmable array of logic elements 108. The hardware decryption engine 106 also includes a register 110, which is pre-stored with a first secret configuration key $K_{config}$. As shown in FIG. 4 the non-volatile store 102 stores an encrypted configuration program, which has been encrypted with the first secret configuration key $K_{config}$. As shown in FIG. 4, once the configuration program has been decrypted it is then loaded into the programmable array to program that array to perform certain functions. These functions are represented in a section of FIG. 4 within lines 112, 114. The functions performed by the programmable array when the configuration program in accordance with the present technique configures the array 108 will be explained in the following paragraphs.

Once the FPGA 100 has powered up, in accordance with a standard operation, the encrypted configuration program is read from the non-volatile store 102 by the hardware decryption engine 106, which decrypts the encrypted configuration program using the first secret configuration key $K_{config}$ retrieved from the register 110. In accordance with a conventional operation the decrypted configuration program is then used to program the programmable array 108. A first functional element formed by the programmable array, when configured with the configuration program, is a decryption engine 120 which implements a duplicate function of the decryption *hardware engine 106. A second functional element formed by the configuration program is a public key/private key generator 122. A third functional element is a control processor 124 and a fourth functional element is an encryption engine 126.

The decryption engine 120 is arranged to re-read the encrypted configuration program from the non-volatile memory 102 and decrypt the configuration program using the secret configuration key $K_{config}$ which is provided as part of the configuration program itself which was decrypted by the hardware decryption engine 106. The decryption engine 120 therefore decrypts again the configuration program and stores this temporarily in a local memory 121, which forms part of the controller 124. The public key/private key generator 122 then generates a private key/public key pair $K_{PU\_FPGA}$/$K_{PR\_FPGA}$ which is not known to any other functional element. The public key $K_{PU\_FPGA}$ can be provided on a separate channel 128 for publication to an encryption processor, for example to distribute the video content. However, the private key $K_{PR\_FPGA}$ is received by the controller 124. The controller 124 then inserts the private key $K_{PR\_FPGA}$ into the configuration program so that the configuration program has now been adapted to include the private key generated by the private key/public key generator 122. The adapted program is then passed to the encryption engine 126, which again encrypts the configuration program using the first secret configuration key $K_{config}$. The control processor 124 then overwrites the previous version of the configuration program in the non-volatile store 102 by outputting the encrypted and adapted configuration program on a channel 130 which is fed to the non-volatile store 102 for storage therein.

The operation of the FPGA during an initialisation phase is represented by the flow diagram in FIG. 5, which is summarised as follows:

S1: The FPGA powers up and the hardware decryption processor reads the encrypted configuration program file from the non-volatile store. The hardware decryption processor decrypts the configuration program using a first secret configuration key stored in a register in the decryption processor.

S2: The FPGA then configures the programmable array using the decrypted configuration program. Thus far the operation of the FPGA is and corresponds to a conventional operation for configuring itself with an encrypted configuration bit file.

S4: The configured programmable array then performs certain functions. The first function is for the configured array to re-read the encrypted configuration program from the non-volatile store.

S6: A decryption engine formed in the configured array then decrypts the encrypted configuration program which has been re-read from the non-volatile store using a first secret configuration key provided within the configuration program. That is to say, the first secret configuration key is provided when the configuration program was decrypted initially by the hardware decryption engine.

S8: The configured array generates a private key/public key pair referred to as $K_{PU\_FPGA}/K_{PR\_FPGA}$.

S10: The configured array then adapts the configuration program to include the private key $K_{PR\_FPGA}$ for decrypting content data encrypted using the public key $K_{PU\_FPGA}$. Thus, the FPGA itself has generated a secret, which is not known outside the FPGA and will now be stored in a secure way in the non-volatile store.

S12: The configured array then encrypts the adapted configuration program which includes the secret private key $K_{PR\_FPGA}$ and overwrites the encrypted configuration program in the non-volatile store.

Figure 6:
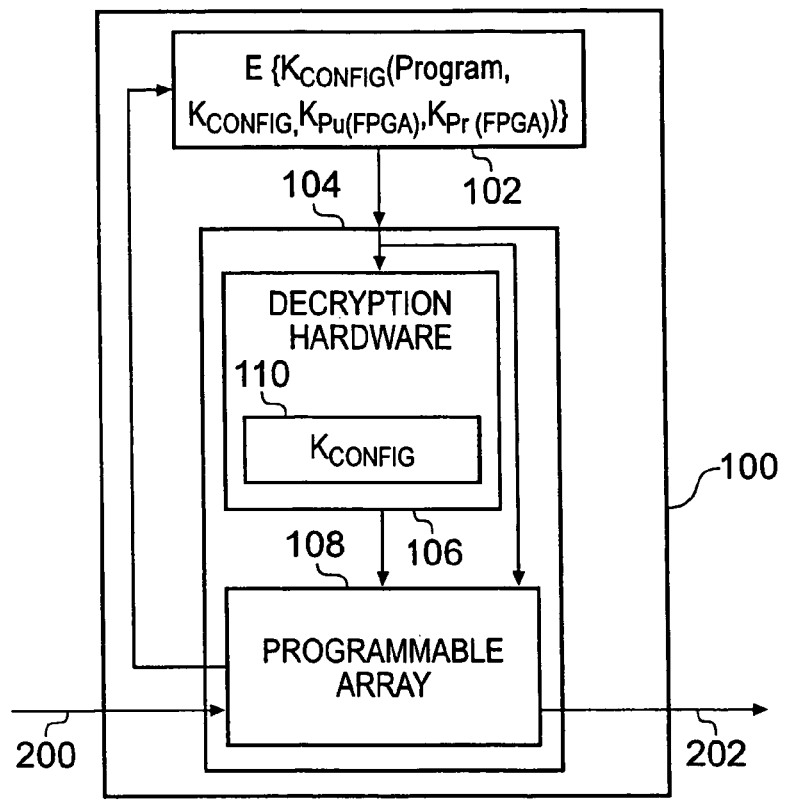
FIG. 6 is a part schematic block diagram, part flow diagram illustrating the programmable logic device of FIG. 4 when operating to decrypt encrypted content data.
Figure 6:
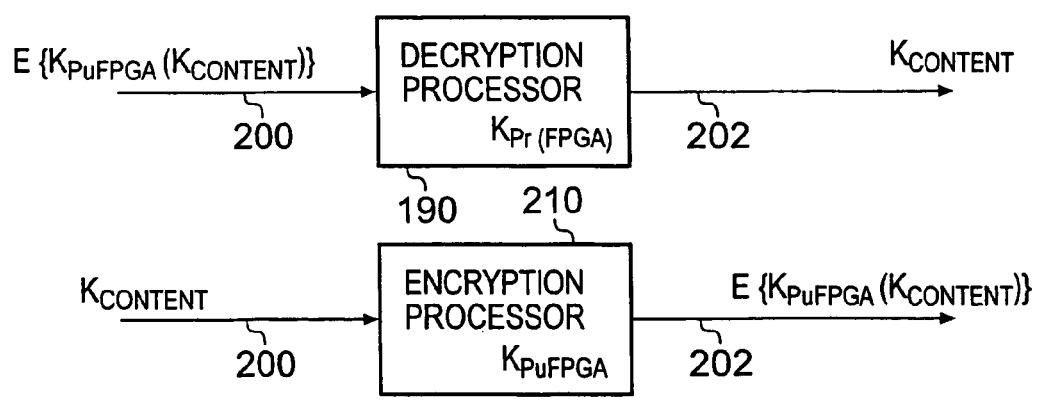

According to this operation the private key $K_{PR\_FPGA}$ is now secret but can now be used to decrypt content encrypted with the corresponding public key $K_{PU\_FPGA}$. Thus following initialisation the FPGA is ready to decrypt content in accordance with the normal operation. FIG. 6 provides a representation of the FPGA shown in FIG. 4 with the programmable array configured to form a decryption processor and/or an encryption processor, although parts also shown in FIG. 4 having the same numerical designations operate in the same way and so will not be explained further. In accordance with the normal operation on power up, the encrypted and adapted configuration program is received by the decryption hardware engine 106 decrypted and used to program the programmable array. In accordance with a conventional operation, the programmable array forms a decryption engine 190 which is arranged to decrypt content, which has been encrypted with a public key $K_{PU\_FPGA}$ corresponding to the private key $K_{PR\_FPGA}$ which is now included in the configuration program. Thus, for the example represented in FIG. 1, the content key $K_{content}$, which has been encrypted with the public key $K_{PU\_FPGA}$, can be decrypted using the private key $K_{PR\_FPGA}$ to reproduce on an output channel 202 the content key $K_{content}$.

Figure 7:
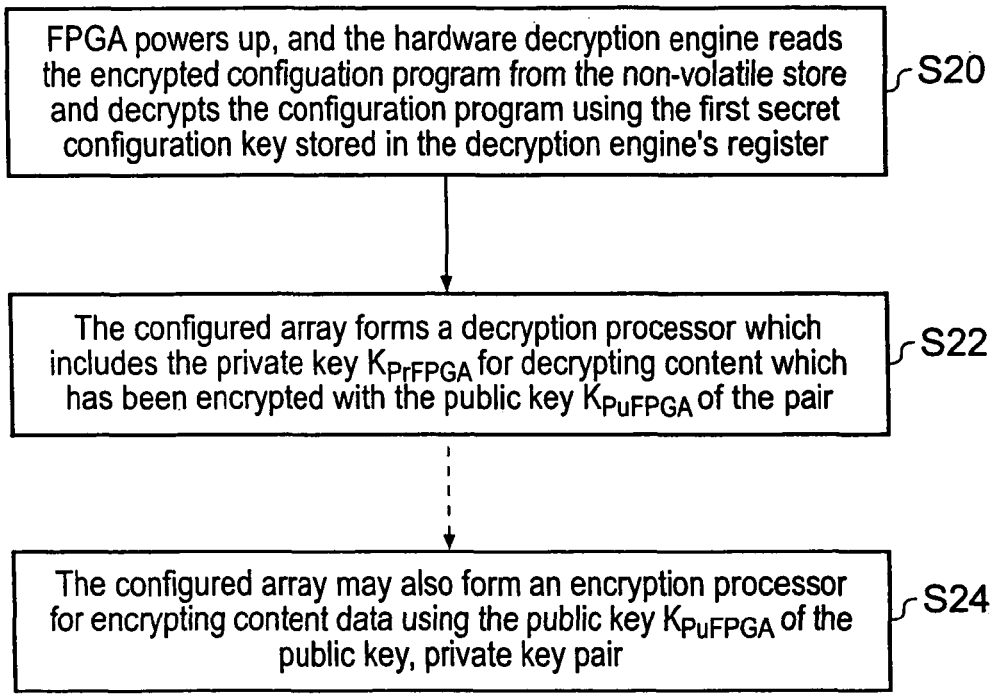
FIG. 7 is flow diagram illustrating the operation of the programmable logic device shown in FIG. 6.

For an example in which the FPGA is forming an encryption processor, the programmable array may be configured to encrypt the content key using an encryption engine 210. The content key $K_{content}$ received on the input channel 200 is encrypted by the configured programmable array using the public key $K_{PU\_FPGA}$. The encryption engine 210 produces the encrypted content key $K_{content}$ at the output of the encryption engine 202. Thus the operation of the FPGA is represented by a flow diagram shown in FIG. 7 which is summarised as follows:

S20: The FPGA powers up and the hardware decryption engine reads the encrypted configuration program from the non-volatile store. The decryption engine decrypts the configuration program using the first secret configuration key $K_{config}$ which is stored in the decryption engine's register 110.

S22: The configured array forms a decryption processor, which includes the private key $K_{PR\_FPGA}$ provided within the decrypted configuration program. The private key $K_{PR\_FPGA}$ can then be used to decrypt content which has been encrypted with the public key $K_{PU\_FPGA}$ of the private key/public key pair.

S24: Correspondingly, in another example, the configured programmable array may also form an encryption processor for encrypting the content data using the public key $K_{PU\_FPGA}$ of the public key/private key pair. For this example, a public key $K_{PU}$ may be provided by another FPGA processor since public keys are usually published to the transmitting component of the system.

Figure 8:
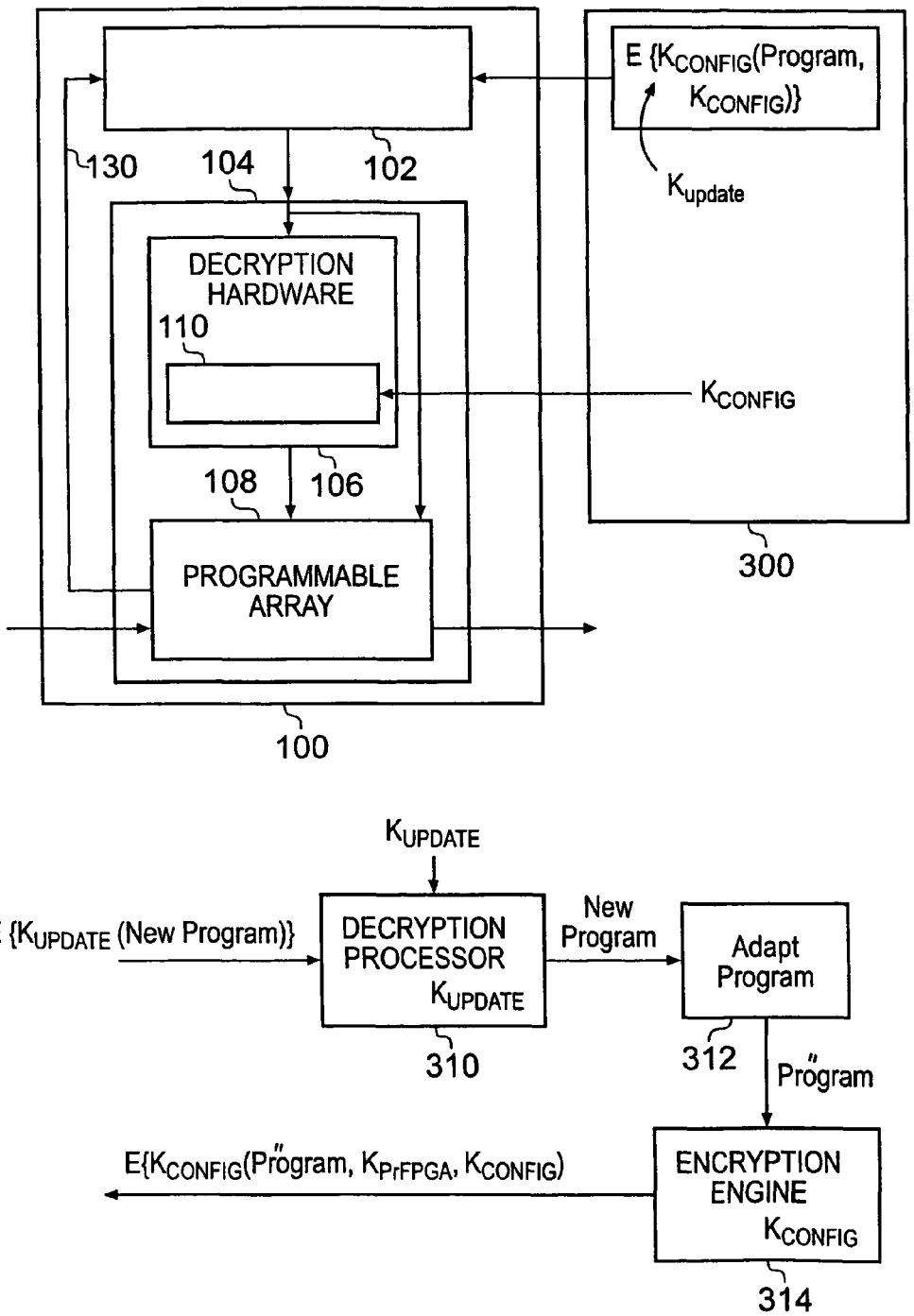
FIG. 8 is a part schematic block diagram, part flow diagram illustrating an arrangement in which the programmable logic device is pre-programmed with an encrypted configuration program.

FIG. 8 provides a further illustration of another embodiment of the present invention, which is provided with a first secret configuration key $K_{config}$ during a pre-initialisation stage. The pre-initialisation stage may take place when the FPGA is being integrated within a receiver for decrypting content. The FPGA which also appears in FIGS. 4 and 6 is also shown in FIG. 8 where parts with the same numerical references perform the same function and so will not be explained further. As shown in FIG. 8 a manufacturing component which will be referred to as a "manufacturing jig" is arranged to be attached to an FPGA 100 to the effect of accessing the non-volatile store 102 and the register 110 within the hardware decryption engine 106. Thus the manufacturing jig 300 is arranged to generate the secret configuration key $K_{config}$. Once the secret configuration key $K_{config}$ has been generated it can be inserted into the configuration program before the configuration program is itself encrypted with that configuration key $K_{config}$. The encrypted configuration program can then be loaded into the non-volatile store 102 in preparation for use. The configuration key $K_{config}$ can then be destroyed or recorded by the manufacturer as appropriate. Once the configuration key $K_{config}$ has been loaded onto the FPGA there is no requirement for it to be known to any other party and accordingly to improve security the configuration key may be destroyed.

In a further example the configuration program is provided with a further key to provide a facility for updating the configuration program once the FPGA has been deployed in a receiver for decrypting content. To this end, the manufacturing jig 300 is provided with a secret update key $K_{update}$ which is also loaded into the configuration program before being encrypted with the configuration key $K_{config}$ and loaded into the non-volatile store as before. In operation, as shown in FIG. 8 the programmable array when configured with the configuration program includes further functional elements which are a decryption engine for an update program 310, a control processor 312, and an encryption engine 314.

In operation the programmable array receives on an input channel 200 a new program element which has been encrypted with the update key $K_{update}$. The decryption engine 310 can then decrypt the new program element using the secret key $K_{update}$ provided with the configuration program. The new program element is then passed to the control processor 312, which adapts the configuration program with the new functional elements. The new functional elements may provide for example new functionality or may fix bugs in the existing configuration program. The adapted configuration program is then passed to the encryption engine 314 which encrypts the newly adapted configuration program using the secret configuration key $K_{config}$ before the encrypted configuration program is written back into the non-volatile store 102 over the previous version of the configuration program.

Figure 5:
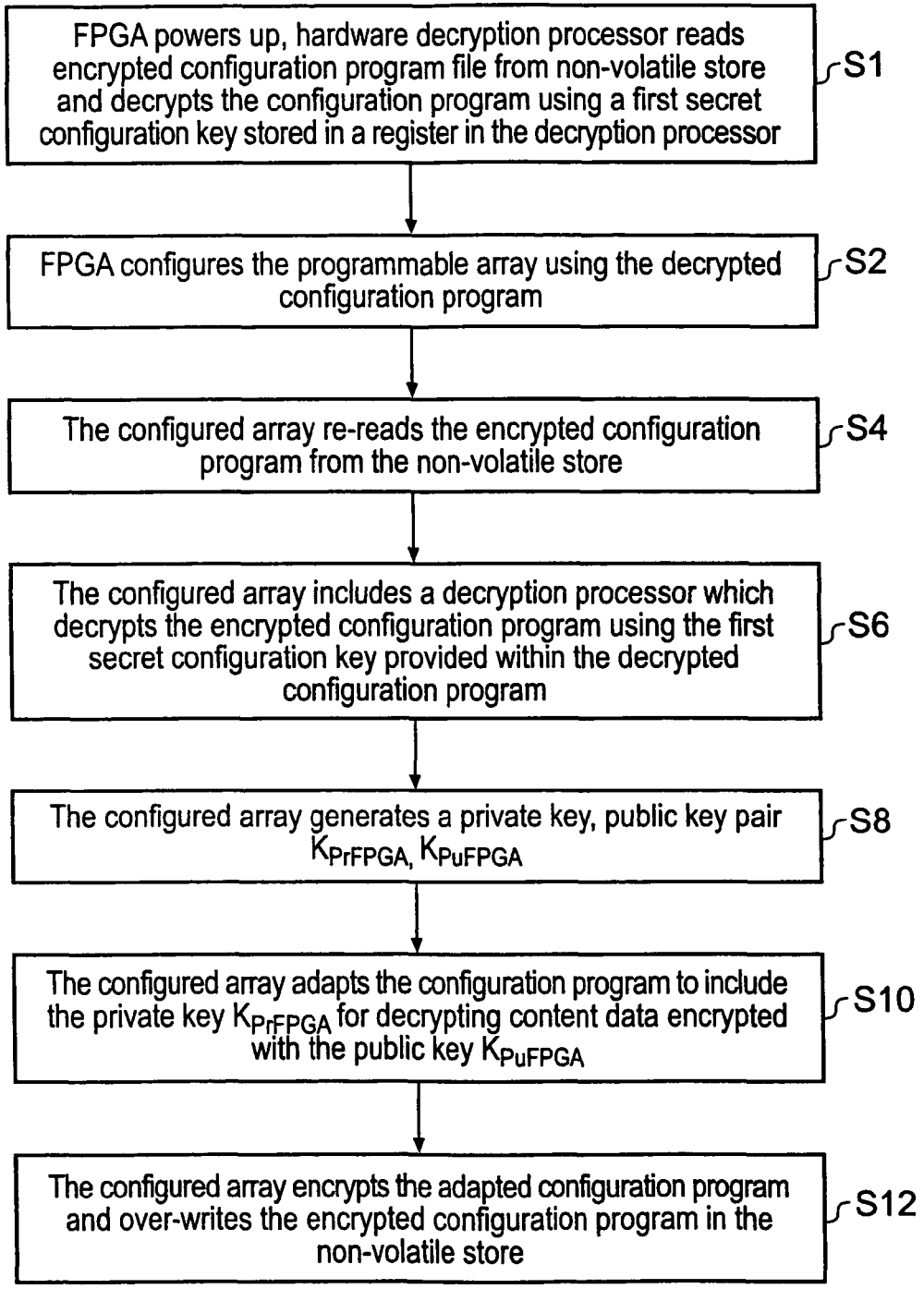
FIG. 5 is a flow diagram illustrating an initialisation phase of the programmable logic array shown in FIG. 4.
Figure 9:
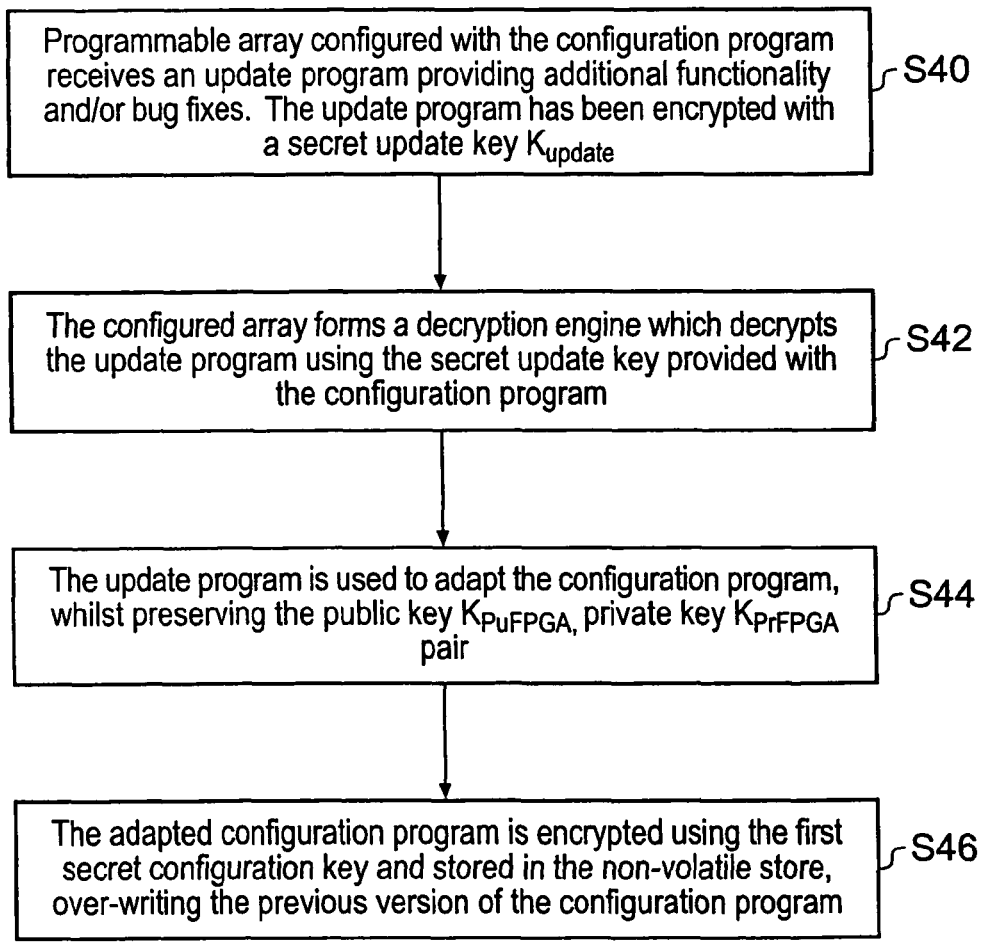
FIG. 9 is a flow diagram illustrating an operation by which the programmable logic device is adapted in accordance with an updated configuration program.

In accordance with the embodiment represented in FIG. 8, the configuration program is adapted in accordance with the new program element whilst at the same time preserving the private key $K_{PR\_FPGA}$ which was generated by the FPGA when it first initialised itself as represented by the flow diagram of FIG. 5. Accordingly, the configuration program has been updated whilst preserving the private key $K_{PR\_FPGA}$ for decrypting content which has been encrypted with the corresponding public key $K_{PU\_FPGA}$. The operation of the embodiment shown in FIG. 8 is summarised by the flow diagram in FIG. 9. FIG. 9 is described as follows:

S40: The programmable array, which has been configured with the configuration program receives an update program providing additional functionality and/or bug fixes. The update program has been encrypted with a secret update key $K_{update}$.

S42: The configured array forms a decryption engine which decrypts the update program using the secret update key $K_{update}$ provided with the configuration program using the manufacturing jig 300.

S44: The update program is used to adapt the configuration program whilst preserving the public key/private key pair $K_{PU\_FPGA}/K_{PR\_FPGA}$.

S46: The adapted configuration program is encrypted using the first secret configuration key $K_{config}$ and stored in the non-volatile store overwriting the previous version of the configuration program.

To improve security in the update of the configuration program, in some examples, the update program may include a new update key $K_{new\_update}$. As such, when a subsequent update program is received, which has been encrypted with the new update key $K_{new\_update}$, then this can be decrypted and the subsequent update program recovered to perform an update of the configuration program. As such, the subsequent update program may provide a further update key to decrypt a further update program. Accordingly, whenever an update program is sent to the FPGA, a new update key is provided for decrypting a subsequent update program. This has two advantages. The first is that the FPGA is assured of the authentication of the update program, because the new configuration program has been effectively signed with a secret update key shared with the FPGA. The second advantage is that a danger of the update program being decrypted to determine its contents and determine the operation of the configuration program is reduced, thereby improving security.

Figure 10:
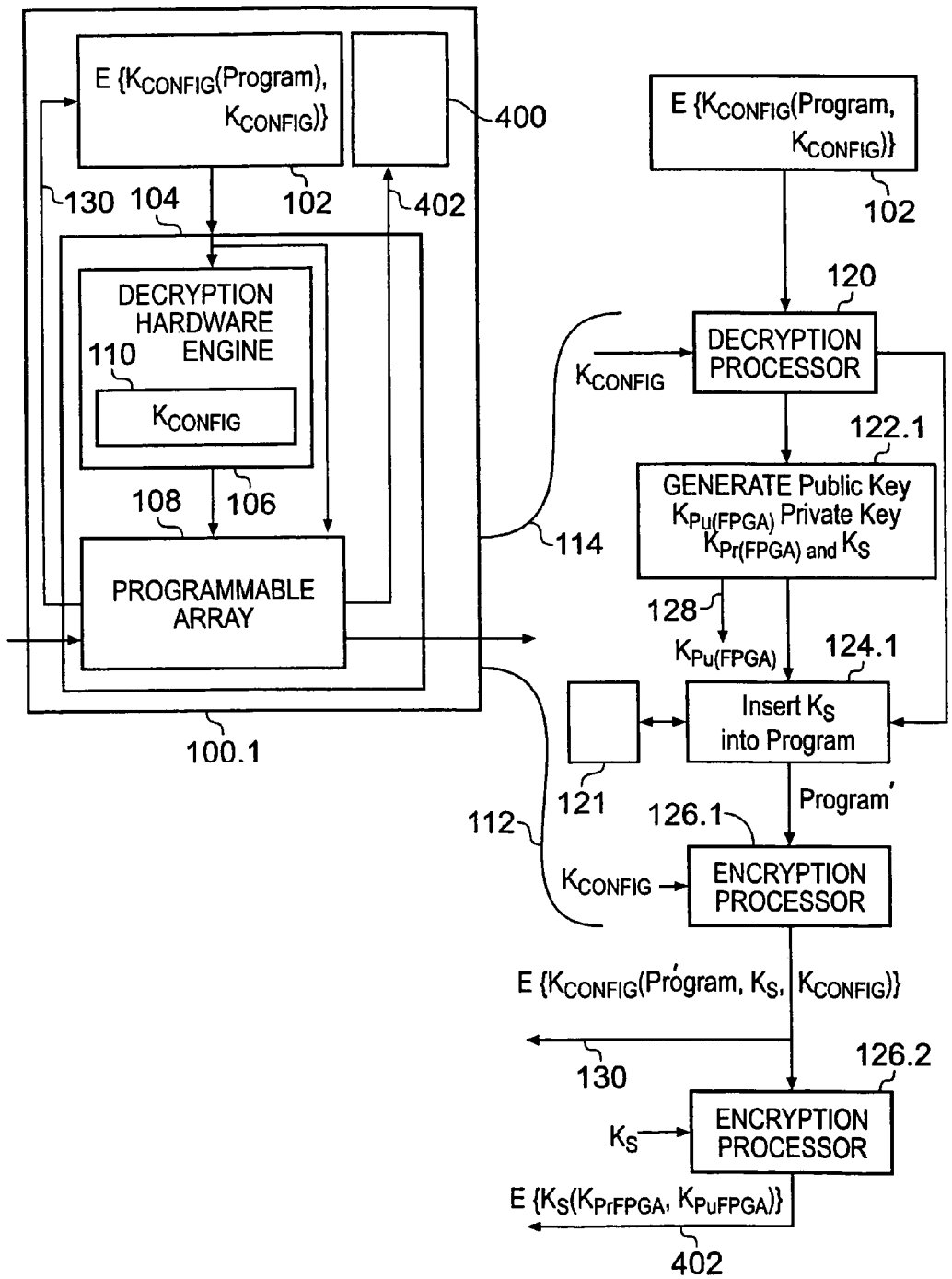
FIG. 10 is a part schematic block diagram, part flow diagram illustrating a programmable logic device, which is configured to perform a process of encrypting and/or decrypting data according to a further example.

A further example embodiment of the present invention is shown in FIG. 10, which corresponds to FIG. 4 and so like parts have the same numerical references and an explanation of those parts will not be repeated here. Essentially, the example shown in FIG. 10 differs from that shown in FIG. 4, in that the FPGA 100.1 includes a second non-volatile store 400, which is used to store the private key/public key pair in encrypted form. As well as generating the private key/public key pair $K_{PU\_FPGA}/K_{PR\_FPGA}$ a key generator 122.1 also generates a secret private key $K_S$ for symmetric encryption. The controller 124.1 adapts the configuration program by inserting the secret key $K_S$ into the configuration program. As with the previous example, the encryption processor 126.1 then encrypts the adapted configuration program and stores this in the first non-volatile store 102. An encryption processor 126.2 then encrypts the private key/public key pair $K_{PU\_FPGA}/K_{PR\_FPGA}$ and the encrypted key pair is stored in the second non-volatile store 400 via the connecting channel 402.

The private key of the private key/public key pair $K_{PU\_FPGA}/K_{PR\_FPGA}$ can be relatively long, for example 2048-bits, whereas a private secret key for symmetric encryption can be in the order of, for example, 128-bits. As such, storing the private key of the public key/private key pair in the first non-volatile store 102 can be more difficult because of a limited storage capacity occupied by the private key. As such, storing the public key/private key pair in the second non-volatile store 402, can alleviate this difficulty. To protect the security of the private key of the private key/public key pair, the secret key $K_S$ is generated and used to encrypt the private key/public key pair $K_{PU\_FPGA}/K_{PR\_FPGA}$ for storage in the second non-volatile store 402. The secret key $K_S$ having been inserted in the configuration program can be recovered to decrypt the key pair $K_{PU\_FPGA}/K_{PR\_FPGA}$, when the logic array is configured with the configuration program.

Various respective aspects and features of the present invention are defined in the appended claims. Modifications may be made to the embodiments described above without departing from the scope of the present invention. In particular, although the example embodiment has been used with respect to distributing video content in a broadcast scenario, it would be appreciated that this is just one example of data which may be encrypted and the present invention can be applied to communicating any type of content such as audio, text, monetary or financial data, computer programs in a variety of applications such as broadcast, multicast or unicast communications. The example of a field programmable gate array has been provided but it will be appreciated that this is just one example of a programmable logic device.

The invention claimed is:

1. A programmable logic device, comprising:
    a programmable array of logic elements which when loaded with a configuration program is operable to perform a process in accordance with a configuration of the logic elements by the configuration program; and
    a hardware decryption processor including a register having stored therein a first secret configuration key, and a non-volatile store arranged to store the configuration program which has been encrypted with the first secret configuration key, wherein the configuration program includes therein the first secret configuration key, and
    the hardware decryption processor is operable, when power is applied to the programmable logic device, to read the encrypted configuration program, to decrypt the encrypted configuration program using the first secret configuration key stored in the register, and to configure the programmable array of logic elements with the configuration program,
    the programmable array when configured with the configuration program being operable to read the encrypted configuration program from the non-volatile store, to decrypt the configuration program using the first secret configuration key provided with the configuration program, to generate a second secret key, to adapt the configuration program by inserting the second secret key into the configuration program, to re-encrypt the adapted configuration program using the first secret configuration key, and to replace the configuration program with the adapted and encrypted configuration program in the non-volatile store.

2. The programmable logic device as claimed in claim 1, wherein the second secret key is a private key and the configured programmable array is operable to generate a public key, the second private key and the public key forming a private/public key pair for performing an asymmetric encryption/decryption.

3. The programmable logic device as claimed in claim 1, wherein the second secret key is a first private key for use in a symmetric encryption process.

4. The programmable logic device as claimed in claim 1, wherein the first secret key is generated during a pre-initialisation stage, during which the first secret key is loaded into the register of the hardware decryption processor and the configuration program, encrypted with the first secret configuration key, is loaded into the non-volatile store.

5. The programmable logic device as claimed in claim 1, wherein the configuration program is provided with a first update key, and the programmable array when configured with the configuration program is operable to receive an update configuration program which has been encrypted with the first update key, to decrypt the update configuration program with the first update key, and to adapt the update configuration program, to the effect that the second secret key is preserved in the adapted configuration program.

6. The programmable logic device as claimed in claim 5, wherein the programmable array when configured with the configuration program is operable to encrypt the adapted update configuration program with the first secret configuration key and to store the encrypted and adapted update configuration program in the non-volatile store.

7. The programmable logic device as claimed in claim 5, wherein the update configuration program includes a second update key, and the programmable array when configured with the adapted update configuration program is operable to decrypt a subsequent update program which has been encrypted with the second update key using the second update key.

8. The programmable logic device as claimed in claim 3, further comprising:
 a second non-volatile store, wherein the programmable array when configured with the configuration program is operable to generate a second private key and a public key forming a private key/public key pair for an asymmetric encryption, to encrypt the second private key and the public key with the second secret key using a symmetric encryption, and to store the encrypted second private key and the public key pair in the second non-volatile store.

9. A receiver for receiving and decrypting encrypted content data, the receiver including a content decryption engine and a content key decryption engine, the content key decryption engine including the programmable logic device as claimed in claim 1, the hardware decryption processor being coupled to the non-volatile store and the register, the programmable array when configured with the configuration program being provided with a private key forming a private key/public key pair with a public key and being operable to receive an encrypted content key provided with the encrypted content data, the content key having been encrypted with the public key, and to decrypt the content key using the private key, which was provided in the configuration program, the content key decryption engine being operable to decrypt the encrypted content data using the content key.

10. A transmitter for encrypting and transmitting content data, the transmitter comprising:
 a content encryption engine operable to encrypt the content data with a content key; and
 a content key encryption engine operable to encrypt the content key with a public key provided by a programmable logic device,
 the programmable logic device comprising
  a programmable array of logic elements which when loaded with a configuration program is operable to perform a process in accordance with a configuration of the logic elements by the configuration program, and
  a hardware decryption processor including a register having stored therein a first secret configuration key, and a non-volatile store arranged to store the configuration program which has been encrypted with the first secret configuration key, wherein the configuration program includes therein the first secret configuration key, and the hardware decryption processor is operable, when power is applied to the programmable logic device, to read the encrypted configuration program, to decrypt the encrypted configuration program using the first secret configuration key stored in the register, and to configure the programmable array of logic elements with the configuration program, the programmable logic array when configured with the configuration program being operable to read the encrypted configuration program from the non-volatile store, to decrypt the configuration program using the first secret configuration key provided with the configuration program, to generate a second secret key, to adapt the configuration program by inserting the second secret key into the configuration program, to re-encrypt the adapted configuration program using the first secret configuration key, and to replace the configuration program with the adapted and encrypted configuration program in the non-volatile store.

11. A method of programming a programmable logic device, the programmable logic device comprising a programmable array of logic elements and a hardware decryption processor including a register having stored therein a first secret configuration key, and a non-volatile store being arranged to store a configuration program which has been encrypted with the first secret configuration key, the method comprising:
 providing the configuration program with the first secret configuration key;
 reading the encrypted configuration program from the non-volatile store;
 decrypting the encrypted configuration program using the first secret configuration key stored in the register;
 configuring the programmable array of logic elements with the configuration program;
 reading the encrypted configuration program from the non-volatile store;
 decrypting the configuration program using the first secret configuration key provided with the configuration program;
 generating a second secret key;
 adapting the configuration program by inserting the second secret key into the configuration program with the programmable array;
 re-encrypting the adapted configuration program using the first secret configuration key; and
 replacing the configuration program with the adapted and encrypted configuration program in the non-volatile store.

12. A computer-readable storage medium encoded with a configuration program for programming an array of logic elements of a programmable logic device, the programmable logic device comprising the array of logic elements, which when loaded with the configuration program is operable to perform a process in accordance with a configuration of the logic elements by the configuration program, and a hardware decryption processor including a register having stored therein a first secret configuration key, and a non-volatile store arranged to store the configuration program which has been encrypted with the first secret configuration key, wherein the configuration program includes therein the first secret configuration key, the configuration program when executed by the array of logic elements causing the array of logic elements to perform the operations of:
 reading the encrypted configuration program from the non-volatile store;

decrypting the configuration program using the first secret configuration key provided with the configuration program;

generating a second secret key;

adapting the configuration program by inserting the second secret key into the configuration program;

re-encrypting the adapted configuration program using the first secret configuration key; and replacing the configuration program with the adapted and encrypted configuration program in the non-volatile store.

13. A manufacturing jig arranged for use with a programmable logic device, the programmable logic device comprising a programmable array of logic elements which when loaded with a configuration program is operable to perform a process in accordance with a configuration of the logic elements by the configuration program, and a hardware decryption processor including a register having stored therein a first secret configuration key, and a non-volatile store arranged to store the configuration program which has been encrypted with the first secret configuration key, wherein the configuration program includes therein the first secret configuration key, and the hardware decryption processor is operable, when power is applied to the programmable logic device, to read the encrypted configuration program, to decrypt the encrypted configuration program using the first secret configuration key stored in the register, and to configure the programmable array of logic elements with the configuration program, the programmable array when configured with the configuration program being operable to read the encrypted configuration program from the non-volatile store, to decrypt the configuration program using the first secret configuration key provided with the configuration program, to generate a second secret key, to adapt the configuration program by inserting the second secret key into the configuration program, to re-encrypt the adapted configuration program using the first secret configuration key, and to replace the configuration program with the adapted and encrypted configuration program in the non-volatile store, the manufacturing jig being arranged in use:

to generate the first secret configuration key;

to encrypt the configuration program with the first secret configuration key;

to load the encrypted configuration program into the non-volatile store of the programmable logic device; and to load the register of the programmable logic device with the first secret configuration key.

14. An apparatus for programming a programmable logic device, the programmable logic device comprising a programmable array of logic elements, and a hardware decryption processor including a register having stored therein a first secret configuration key, and a non-volatile store being arranged to store a configuration program which has been encrypted with the first secret configuration key, the apparatus comprising:

means for providing the configuration program with the first secret configuration key;

means for reading the encrypted configuration program from the non-volatile store;

means for decrypting the encrypted configuration program using the first secret configuration key stored in the register; and means for configuring the programmable array of logic elements with the configuration program, the programmable array when configured with the configuration program including means for reading the encrypted configuration program from the non-volatile store, means for decrypting the configuration program using the first secret configuration key provided with the configuration program, means for generating a second secret key, means for adapting the configuration program by inserting the second secret key into the configuration program, means for re-encrypting the adapted configuration program using the first secret configuration key, and means for replacing the configuration program with the adapted and encrypted configuration program in the non-volatile store.

* * * * *